United States Patent

[11] 3,543,872

| [72] | Inventor | Lawrence M. Halls<br>New Holland, Pennsylvania |
|---|---|---|
| [21] | Appl. No. | 802,502 |
| [22] | Filed | Feb. 26, 1969 |
| [45] | Patented | Dec. 1, 1970 |
| [73] | Assignee | Sperry Rand Corporation<br>New Holland, Pennsylvania<br>a corporation of Delaware |

[54] HEADER SUPPORTING TRACTOR FRAME
12 Claims, 7 Drawing Figs.

[52] U.S. Cl. ............................................. 180/27
[51] Int. Cl. ......................................... B62d 61/06
[50] Field of Search ............................... 180/25, 26, 27; 280/62; 56/23, 228

[56] References Cited
UNITED STATES PATENTS
1,235,249  7/1917  Salfisberg................  180/727

1,892,865  1/1933  Brown..........................  180/27
2,596,633  5/1952  Wiersig.......................  180/27

*Primary Examiner*—Leo Friaglia
*Assistant Examiner*—Robert R. Song
*Attorneys*—Joseph A. Brown, John C. Thompson, James J. Kennedy and George C. Bower ABSTRACT: A tractor for carrying and operating a header has a rigid main frame with a longitudinally extending center beam intermediately positioned between two transversely spaced drive wheel side members and with cross and torsion beams rigidly attached to the side members and the center beam. The frame is supported in front by two transversely spaced drive wheels and supported in the rear by a detachable tail wheel assembly with a pivotally mounted tail wheel spaced from the rear of the main frame. The tail wheel assembly is mountable in a compact shipping position with the tail wheel at the rear of the frame.

Patented Dec. 1, 1970
3,543,872
Sheet 1 of 2
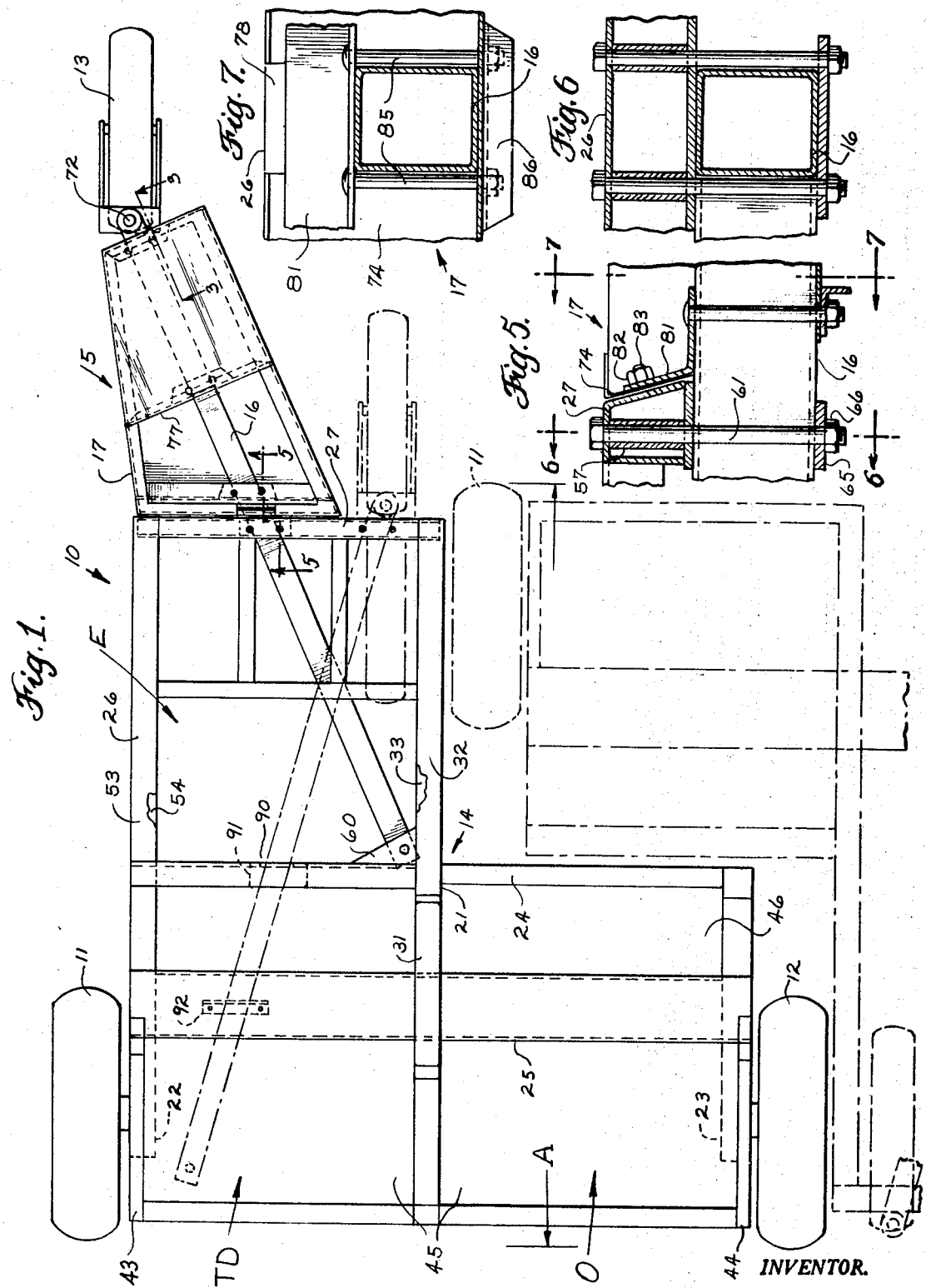
INVENTOR.
Lawrence M. Halls
BY
George C. Bower
Attorney Patented Dec. 1, 1970
3,543,872
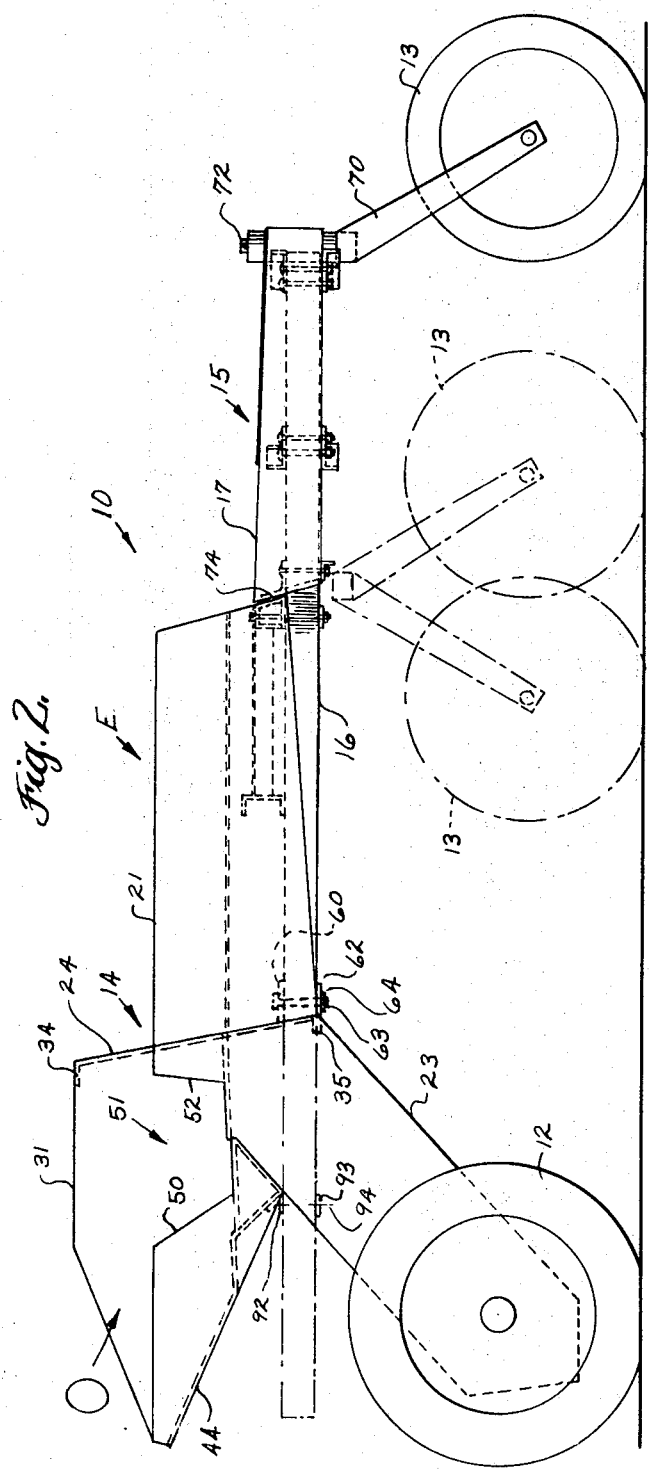
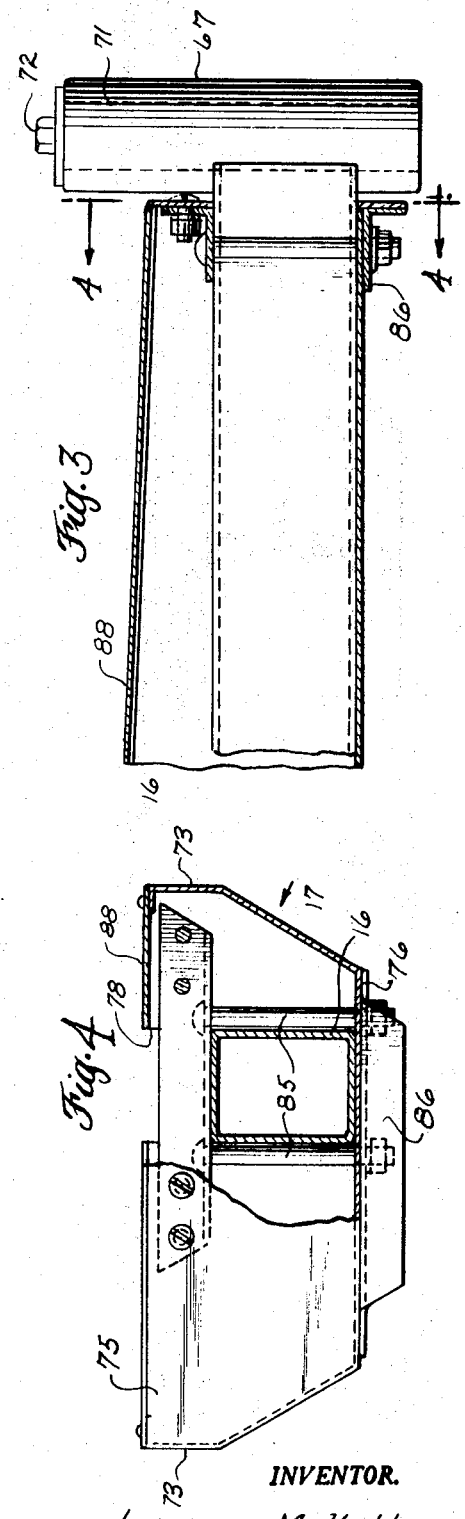
INVENTOR.
Lawrence M. Halls
BY
George C. Bower
Attorney

HEADER SUPPORTING TRACTOR FRAME

BACKGROUND OF THE INVENTION

This invention relates to tractors for supporting headers on the front to form a self-propelled agricultural harvesting machine and is directed particularly to the tractor supporting frame.

In tractors for self-propelled agricultural harvesting machines the headers are mounted on the front of the tractor and discharge the cut crops from the rear underneath the following driving tractor. In passing over the crops the tractor wheels must not ride on the cut crops. The width of distribution of the cut crops is therefore limited by the span between the wheels. This span should be as wide as possible for laying of thin swaths.

Present tractors have A-type frames with the base at the front and the apex at the rear. The drive wheels are transversely spaced and mounted at opposite ends of the base. The tail wheel is pivotally mounted at the apex which is on one side in order that the tail wheel will also clear the laid crops.

For a greater span between the wheels the base is widened and the frame enlarged. The larger frame requires heavier and larger beams and members for a rigid frame that does not twist. The desired span between the wheels and the length of the frame is greater than the dimensions permissible for shipment. One length of the frame must be within the permissible dimension or the frame sectionalized for shipment. The A-type frame cannot be sectionalized without loss of rigidity. Further when sectionalized the main portions of two frames cannot be compactly arranged. Another disadvantage to an enlarged A-type frame is the increase in size of the members which increases the cost of materials.

It is therefore desirable to provide a new enlarged frame that is rigid with members smaller than an enlarged A-type frame and is readily adaptable to shipping requirements and compactness.

OBJECTS AND SUMMARY OF THE INVENTION

An object of this invention is to provide a header carrying tractor frame having drive wheels with a span greater than the maximum shipping dimensions that is rigid yet adaptable to shipping requirements.

Another object of the invention is to provide a tractor that is nestable with other tractors for compact shipment.

Another object of the invention is to provide a header carrying tractor with widely separated drive wheels that is sectionalizable without impairing the rigidity of the main frame.

Another object of the invention is to provide a tractor with a wide drive wheel span that is sectionalizable and nestable for compact shipment of a plurality of tractors.

Another object of the invention is to provide a main frame for a tractor carrying header that supports the drive wheels at a wide span and is rigid and economical in structural materials.

In summary this invention comprises the supporting frame of a tractor for carrying headers that mount the drive wheels wide apart and has a rigid main frame and a tail assembly rigidly and detachably secured to the main frame in two positions.

BRIEF DESCRIPTION OF THE DRAWINGS

FIG. 1 is a top view of the frame of the tractor without the power source, drives, controls and operator's equipment.

FIG. 2 is a side view of the tractor frame shown in FIG. 1.

FIG. 3 is a sectional view of the rear attachment of the weight pan to the tail beam taken along line 3-3 of FIG. 2.

FIG. 4 is a rear view of the weight pan with the rear pan fragmentarily shown and the tail beam shown in section along lines 4-4 of FIG. 3.

FIG. 5 is a fragmentary sectional view of the attachment of the rear cross beam to the main frame of the tractor and to the forward cross panel of the weight pan taken along lines 5-5 of FIG. 1.

FIG. 6 is a transverse sectional view of the attachment of the trail beam to the rear cross beam of the tractor frame taken along line 6-6 of FIG. 5.

FIG. 7 is a transverse sectional view of the attachment of the tail beam to the forward cross panel of the weight pan taken along line 7-7 of FIG. 5.

DETAILED DESCRIPTION OF THE PREFERRED EMBODIMENT

Introduction

The tractor shown in FIGS. 1 and 2 is used to support a header (not shown) on the front to form a self-propelled agricultural harvester for cutting and conditioning crops. The header discharges the crops rearwardly for formation into either a windrow or swath underneath the tractor.

The tractor has a supporting frame 10 mounted in front on transversely spaced drive wheels 11, 12 and in the rear on a tail wheel 13. The supporting frame comprises a main frame 14 and a tail wheel assembly 15. The main frame 14 is divided into an engine section E, operator's section 0 and transmission and drive section TD. The engine, belt drives, transmissions, controls and operator's equipment have been omitted for purposes of simplifying the illustration of the main frame. The a tail wheel assembly 15 comprises a tail beam 16, a tail wheel 13 and a weight or ballast pan 17.

Main Frame

The main frame 14 basically comprises a longitudinally extending center beam 21 midway between the two parallel side members 22, 23. The side members 22, 23 have the drive wheels 11, 12 respectively rotatably mounted therein on the sides opposite to the center beam. Extending transversely across the tractor and perpendicular to the center beam 21 and side members 22, 23 are the cross beam 24 and torsion beam 25 which are rigidly attached to the center beam 21 and the side members 22, 23 by welding. The cross and torsion beams are parallel and the torsion beam is spaced from and in front of the cross beam. The engine section E is formed by the center beam 21 extending rearwardly from the cross beam 24 and by a side beam 26 extending rearwardly from the right side member 22 and approximately parallel to the center beam. The center beam is shown parallel to the side members. However, the center beam may be at a slight angle to provide a slight taper to the engine section. At the rear a beam 27 transversely bridges the ends of center beam and side beam to complete the section. The left side member 23 rearwardly terminates at the cross beam to impart an L-shaped to the main frame.

The center beam 21 is made of sheet steel and has upper and lower flanges 32, 33 extending towards the right side. At the engine section E the center beam 21 rearwardly narrows in a slight taper. Forwardly from the cross beam, the center beam narrows slightly to the torsion beam and then sharply tapers forwardly of the torsion beam 25 to accommodate the front panel 28. The center beam has an extension 31 between the operator's section 0 and the transmission section TD projecting upwardly to carry the operator's controls and to form part of the transmission and drive housing with the right portion of the cross beam.

The cross beam 24 is also of sheet steel and has upper and lower flanges 34, 35 projecting of forwardly. It extends upwardly from the lower flange 33 of the center beam 21 to the top of the engine support portion of the center beam on the left or operator's side of the center beam. On the right side the cross beam 24 extends with the center beam extension 31 to provide space for the transmission, drives and controls.

The torsion beam 25 is of a generally triangular configuration as illustrated in FIG. 2 and is formed in a tubular construction from sheet metal and welded to the left side member 23 and to the center member 21 and the right side member 22. The torsion beam has an upper wall 40, rear sloped wall 41 and forward sloped wall 42.

The right side member 22 and the left side member 23 are attached to the torsion beam 25 and the cross beam 24 and extend downwardly at a forward angle. The drive wheels are rotatably mounted in the lower end of a respective side member. The side members 22, 23 comprise two parallel sheet metal members with edge strips to form drive containing casings open at the top between the cross beam and the torsion beam for passing the wheel drives.

On the front of the tractor are the side panel members 43, 44 extending forwardly of the side members and torsion beam. A front panel 45 extends across the tractor between the side panels 43, 44 to enclose the bottom of the transmission section and operator's sections. The front panel extends to the forward edge of the torsion beam and is welded thereto. On the operator's section there is a floor panel 46 between the rear edge of the torsion beam and the cross beam. The side panel has a sloped flange edged 50 forming an opening 51 with the sloped flange edge 52 of the cross beam to provide an entrance to the operator's section. A hinged cover over the transmission and drive se sections has been omitted from the drawings to better illustrate the frame.

At the engine section the side beam 26 has upper and lower flanges 53, 54 extending inwardly towards the center beam. The rear beam 27 is tubular and formed by a U-shaped piece 55 and a flat strip 56. The beam is substantially narrower than the center beam and side beam and is mounted on and welded to the lower flanges 33, 54 of the center beam and cross beam. Inside the rear beam are sleeves 57 provided for guiding bolts 61 through the rear beam to clamp the tail beam 16 on the frame as later described herein.

The center beam and the side beam forming the rear section have a substantial vertical width. Internal combustion engine support means 29 are positioned at the rear and attached to the lower portion of the center and side beams. The engine can be partially recessed between the center and side beams.

The cross and center beams 24, 21 are welded together and the cross beam is welded to the side members 22, 23. The torsion beam 25 is welded to the center beam 21 at the ends abutting the center beam and to the side members along the edge of the rearwardly facing surface. This single piece welded structure of the cross beams, center beams, torsion beams, side beam and side members is rigid and carries the weight of the header, engine controls and other components.

Tail Wheel Assembly

The tail beam 16 extends at an angle from the adjacent to the intersection of the cross beam 24 and the center beam 21 to intersect a mid portion of the rear beam 27 and extend beyond for carrying the ballast or weight pan 15 between the tail wheel 13 and engine section E. The angular position of the tail beam places the tail wheel at the right side of the tractor.

The tail beam 16 is of a rectangular tubular shaped shape having four walls. A generally triangular shape bottom plate 62 is welded to the bottom of the flanges 35 and 33 of the cross beam and center beam and a triangular shaped upper plate 60 is welded to the cross beam and center beam above the bottom plate 62 to form a bracket. The end of the beam fits between the bracket plates and is fastened thereto by a bolt 63 and nut 64. At the rear, the beam is secured thereto by bolts 61 (FIG. 5) extending through the internal sleeves 57 in the rear beam 27 and a strap 65 underneath the tail beam. Nuts 66 are threaded on the bolts 61 to securely fasten the tail beam to the frame. The tail beam has a tubular socket 67 normal to the beam. The tail wheel 13 is rotatably mounted in a yoke 70 having a shaft 71 rotatably extending through the tubular socket 67 and fastened thereto by a bolt 92 (FIGS. 2 and 3).

The weight pan 15 has longitudinally extending sides 73, a forwardly sloped wall 74, a rear wall 75, a bottom wall 76 and an intermediate partition 77 to divide the pan into rear and forward compartments. The forward and rear walls 74, 75 and the intermediate partition 77 have rectangular cutouts 78 extending from the upper edges of the walls and partition to the bottom wall for receiving the beam 16.

On the inside of the forward wall is a generally L-shaped bracket 81 slightly greater than a right angle to accommodate the slope of the rear wall. The bracket is detachably mounted on the forward wall and secured thereto by nuts 82 and bolts 83. The partition 77 and rear wall 75 have L-shaped brackets 84 detachably secured thereto. Bolts 85 pass through the brackets 81, 84 and through the bottom wall 76 of the pan. Straps 86 extend across the beam and fastened to the bolts by nuts 87 securing the weight pan on beam.

Ballast in the form of metal clips or pieces placed into the rear compartment with a cover 88. The forward compartment is available for tools and equipment.

The overall length of the tractor may be shortened for shipment by removing the weight pan and positioning the tail beam and tail wheel as shown in dot-dash lines of FIG. 1. During this change the engine section is separately supported. In the shortened shipping position the tail beam 16 is fastened to the left end of the rear beam 27 in the identical manner as in the extended position by bolts passing through the rear beam and a strap underneath the tail beam secured to the bolts 61 by nuts 66. The tail beam extends generally diagonally to the right side of the main frame. The cross beam has a cutout 90 and a strap 91 across the cutout to support the beam. Further forward an angle 92 is mounted along the lower edge of the forward wall 41 of the torsion beam near the right end. A strap 93 is provided on the underside of the beam. Fastening means 94 pass through the angle 92 and strap 93 for holding the beam in supporting relation with the main frame. The tail wheel pivots in the shortened condition as illustrated by the two dot-dash positions of the wheel in FIG. 1. With the tail wheel under the frame the length of the tractor is within shipping dimensions.

Features of the Invention

The tractor frame supports the drive wheels with a wide span to provide space for the crops to be distributed on the ground. By the arrangement of the center beam, cross beam and torsion beam to the side members a rigid frame is attained with smaller beams and elements than an A-type frame with a similar wheel span. This reduction in materials provides a substantial saving in the cost of the machine.

The detachable mounting of the tail wheel assembly permits the tractor to have the desired distance between the front wheels and the tail wheels while being reduced in length to meet shipping dimensions. This detachability adds versatility to the positioning of the engine and the countering the weight of the header so that the center of weight of the tractor with the header is just to the rear of the front wheels. The engine is on the right side and the drive for the header is on the left. The weight of the engine counters the weight of the drive on the header.

An advantageous feature of the engine section is the parallel relation of the center beam and side beam. This spaces the rear ends of the beams to permit the engine to set down between the beams. This positions the weight of the engine closer to the ground than if supported adjacent the apex of an A-type frame. Also the disadvantage of having main portions of the engine extending beyond the sides of the frame is avoided.

A particular feature of the tractor is the generally L-shaped which permits the tractors to be nested for shipping. With the left side of the cross beams of two tractors in back to back relation the distance A between the extremes of the tires is within the prescribed shipping dimensions.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

I claim:

1. A tractor comprising a supporting frame having a main frame with two transversely spaced drive wheels on front and a tail assembly with a tail wheel on the rear, said main frame having two longitudinally disposed transversely spaced side members with a respective drive wheel rotatably mounted therein, a longitudinally extending center beam intermediate said side members, a cross beam and a torsion beam longitudinally spaced and extending transversely across said tractor and rigidly attached to said side members and to said center beam, said center beam extending rearwardly from one of said side members forming a rear supporting section, said tail assembly having a tail beam detachably mounted on said rear supporting section in either an extended operative position or a retracted shipping position or a retracted shipping position with said rotatably tail wheel pivotally mounted in the end of said beam for supporting the rear of said main frame.

2. A tractor as set forth in claim 1 wherein bracket means and a rear beam are provided said bracket means being attached to said center beam and said cross beam and said rear beam being attached to said center beam and said side beam rearwardly of said cross beam and said tail beam is detachably fastened to said bracket means and to the said portion of said rear beam for supporting said main frame in an operative position.

3. A tractor as set forth in claim 1 wherein said torsion beam has a bracket and said tail beam is detachably fastened at the tail beam end to said rear beam with said tail wheel at said rear beam and near the other end to said bracket.

4. A tractor as set forth in claim 1 wherein said cross beam is planar and said torsion beam is tubular.

5. A tractor as set forth in claim 4 wherein said torsion beam is triangular in configuration.

6. A tractor as set forth in claim 3 wherein said main frame and said rear supporting section impart an L-shaped to said supporting frame for nesting of two tractors on shipment.

7. A tractor as set forth in claim 2 wherein a panlike member is detachably mounted on said tail beam between said rear beam and said tail wheel for carrying ballast to counterbalance the weight of the header.

8. A tractor as set forth in claim 7 wherein said engine support means are between said center beam and said side beam in said rear supporting section for supporting an internal combustion engine partially recessed between said center beam and said side beam.

9. A main frame for a header carrying tractor comprising two longitudinally disposed transversely spaced side members for rotatably supporting drive wheels, a longitudinally extending center beam intermediate said side members, a cross beam and torsion beam longitudinally spaced and extending transversely across said tractor and rigidly attached to said side members and to said center beam to form said main frame as a single piece, said center beam extending rearwardly, a side beam extending rearwardly from one of said side members forming a rear supporting section.

10. A main frame as set forth in claim 9 wherein said cross beam is planar and said torsion beam is tubular.

11. A main frame as set forth in claim 10 wherein said torsion beam is triangular in shape.

12. A main frame as set forth in claim 9 wherein a side beam is provided and said side beam and said center beam extends on the other side of said cross beam from said torsion beam to form a supporting frame section.